United States Patent
Baba et al.

(10) Patent No.: US 11,919,467 B2
(45) Date of Patent: Mar. 5, 2024

(54) DRIVER SEAT AIRBAG DEVICE

(71) Applicant: Autoliv Development AB, Vargarda (SE)

(72) Inventors: Yutaka Baba, Kanagawa (JP); Tin Nguyen, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/000,619

(22) PCT Filed: May 20, 2021

(86) PCT No.: PCT/JP2021/019169
§ 371 (c)(1),
(2) Date: Dec. 30, 2022

(87) PCT Pub. No.: WO2021/251096
PCT Pub. Date: Dec. 16, 2021

(65) Prior Publication Data
US 2023/0202418 A1    Jun. 29, 2023

(30) Foreign Application Priority Data
Jun. 8, 2020   (JP) .................................. 2020-099474

(51) Int. Cl.
*B60R 21/203*   (2006.01)
*B60R 21/231*   (2011.01)
*B60R 21/2338*  (2011.01)

(52) U.S. Cl.
CPC .......... *B60R 21/203* (2013.01); *B60R 21/231* (2013.01); *B60R 21/2338* (2013.01); *B60R 2021/23382* (2013.01)

(58) Field of Classification Search
CPC . B60R 21/203; B60R 21/233; B60R 21/2338; B60R 21/231; B60R 21/2032; B60R 21/2035; B60R 21/2037; B60R 2021/23382; B60R 2021/0048; B60R 2021/0009; B60R 2021/0004
(Continued)

(56) References Cited

U.S. PATENT DOCUMENTS

2018/0297548 A1    10/2018    Abramoski et al.

FOREIGN PATENT DOCUMENTS

| CN | 202038265 U | * 11/2011 |
| JP | 2008-222083 A |   9/2008 |

(Continued)

*Primary Examiner* — Keith J Frisby
(74) *Attorney, Agent, or Firm* — Foley & Lardner LLP (57) ABSTRACT

A driver seat airbag device that includes an occupant side panel of a cushion having a larger surface area than that of a steering wheel side panel and a side surface panel that forms the side surface of the cushion; the occupant side panel includes a depressed section recessed toward the steering wheel side and a bulged section in a ring shape positioned surrounding the depressed section; where based on prescribed means pulling toward the steering wheel side, a center area closest to the steering wheel and a first inclined area sloped in a flared shaped from the center area toward the occupant side are formed in the depressed section and a second inclined area continuous with the first inclined area is formed in the bulged section; and the center area and first and second inclined areas restrain the head of the occupant.

11 Claims, 6 Drawing Sheets

(58) Field of Classification Search
USPC .................................. 280/731, 743.2, 743.1
See application file for complete search history.

(56) References Cited

FOREIGN PATENT DOCUMENTS

| | | | |
|---|---|---|---|
| JP | 2017-087891 | | 5/2017 |
| JP | 2017-114160 A | | 6/2017 |
| JP | 2018-020737 A | * | 2/2018 |
| JP | 2018-20737 A | | 2/2018 |
| JP | 2019-018790 A | * | 2/2019 |
| JP | 2019-18790 A | | 2/2019 |
| JP | 2019-123275 A | | 7/2019 |
| JP | 2019-142510 | | 8/2019 |
| JP | 2020-045030 | | 3/2020 |
| WO | WO-2018084479 A1 | * | 5/2018 ............. B60R 21/00 |
| WO | 2018/198443 A1 | | 11/2018 |
| WO | 2019/235145 A1 | | 12/2019 |
| WO | 2020/035994 A1 | | 2/2020 |

\* cited by examiner

DRIVER SEAT AIRBAG DEVICE

TECHNICAL FIELD

The present invention is related to a driver seat airbag device provided with a cushion to restrain an occupant during an emergency.

BACKGROUND ART

Currently, nearly all vehicle steering wheels are equipped with a driver's seat airbag device. A driver seat airbag device is a safety device that is operated in the event of an emergency such as a vehicle collision or the like to receive and protect an occupant by expanding and deploying a cushion based on gas pressure. The cushion of a driver seat airbag device is stowed together with an inflator in a steering wheel and, using gas supplied from the inflator, expands and deploys between the steering wheel and the occupant of the driver seat (for example Patent Document 1).

Patent Document 1 describes an airbag device for an automotive steering wheel. This airbag device for a steering wheel includes an indentation indented on the steering wheel side on a part of the cushion. Upon expansion, a chest indentation of the cushion faces the chest of the occupant to be protected. Patent Document 1 indicates that the chest indentation of the cushion minimizes the load on the chest of the occupant during impact of the occupant with the cushion and further enables effective restraint of the head of the occupant.

RELATED ART DOCUMENTS

Patent Documents

Patent Document 1: Japanese Unexamined Patent Application Publication (Translation of PCT Application) No. 2013-529577

SUMMARY OF THE INVENTION

Problem to be Solved by the Invention

In recent years, Brain Injury Criterion (BrIC) standards have been provided in conjunction with the introduction of the New Car Assessment Program (NCAP) in North America. The Brain Injury Criterion described here is believed to be largely influenced by rotation of the head of the occupant, in particular at high speed. The airbag device for a steering wheel of Patent Document 1 simply restrains the head of the occupant by reducing the load on the chest of an occupant based on a chest depressed section of the cushion and there was still room for improvement regarding suppressing the significant rotation of the head that affects the Brain Injury Criterion.

In light of this manner of problems, an object of the present invention is to provide a driver seat airbag device that receives the head of an occupant by means of a cushion during expansion and deployment, suppresses rotation of the head of the occupant, and suitably protects the head.

Means to Solve the Problem

In order to resolve the problems described above, a typical configuration of a driver seat airbag device according to the present invention, includes:

an inflator stowed in a steering wheel of a vehicle; and
a cushion stowed in the steering wheel with the inflator that uses gas supplied from the inflator to expand and deploy between the steering wheel and an occupant in a driver seat; wherein the cushion includes:
a steering wheel side panel positioned on the steering wheel side,
an occupant side panel having a larger surface area than the steering wheel side panel positioned on the occupant side, and
a side surface panel that connects the steering wheel side panel and the occupant side panel and forms the side surface of the cushion;

the occupant side panel includes:
a depressed section recessed towards the steering wheel side, and
a bulged section positioned surrounding the depressed section that bulges in
a ring shape toward the occupant side; where
a prescribed location of the occupant side panel is pulled to the steering wheel side by prescribed means, therefore the depressed section forms a center area closest to the steering wheel and a first inclined area inclined in a flared shape from the center area toward the occupant side and the bulged section forms a second inclined area that is continuous with the first inclined area and is inclined in a flared shape toward the occupant side; and
the head of the occupant is restrained by the center area and the first and second inclined areas.

In the configuration described above, the cushion has a shape of an occupant side panel that forms a center area and first and second inclined areas for restraining the occupant during expansion and deployment being large and a steering wheel side panel that receives a reaction force from the steering wheel being narrow. Based on the side surface panel, the cushion further ensures a prescribed thickness from the steering wheel side to the occupant side. Therefore, the cushion is able to ensure a prescribed thickness during expansion and deployment as well as a center area and first and second inclined areas for restraining the occupant based on the large occupant side panel.

Here, Brain Injury Criterion (BrIC) standards have been provided in conjunction with the introduction of the New Car Assessment Program (NCAP) in North America. The Brain Injury Criterion described here is believed to be largely influenced by rotation of the head of the occupant, in particular at high speed. Here, based on a depressed section recessed toward the steering wheel side and a bulged section in a ring shape positioned surrounding the depressed section, the occupant side panel with the configuration described above forms first and second inclined areas with surfaces inclined in a flared shape toward the occupant side to restrain the occupant. Therefore, of the occupant side panel of the cushion, the head of the occupant is received in the center area of the depressed section and the first and second inclined areas inclined in a flared shape from the center area of the depressed section toward the occupant side suppress rotation of the head of the occupant and suitably protect the head.

The center area of the depressed section described above is positioned on the rotation axis of the steering wheel. Thus, force received from the head of the occupant by the depressed section of the occupant side panel during expansion and deployment is received on the rotation axis of the steering wheel and so energy absorbed from the impact does not escape. Therefore, the cushion can more reliably receive and protect the head of the occupant.

When the depressed section is viewed from the occupant side described above towards the steering wheel side, the depressed section may have a shape that is vertically symmetrical and laterally symmetrical. Note that viewing the depressed section from the occupant side toward the steering wheel side means, for example, viewing from a plane of the depressed section that is orthogonal to the rotation axis of the steering wheel. Therefore, the depressed section of the cushion can reliably receive the head of the occupant and stably restrain the head regardless of what direction, up, down, left, or right, the head of the occupant enters the depressed section of the occupant side panel during expansion and deployment. Here, examples of outer peripheral shapes of the depressed section include circular, elliptic, square, rectangular shapes, and the like.

When viewing from the occupant side toward the steering wheel side, the depressed section may have a shape where the dimension in the vertical direction is the same as the dimension in the lateral direction. Therefore, the depressed section of the cushion can reliably receive the head of the occupant and stably restrain the head regardless of what direction, up, down, left, or right, the head of the occupant enters the depressed section of the occupant side panel during expansion and deployment. Here, examples of outer peripheral shapes of the depressed section include circular and square shapes, and the like.

When viewing from the occupant side toward the steering wheel side, the depressed section may have a shape where the dimension in the vertical direction is longer than the dimension in the lateral direction. Here, the vertical position where the head of the occupant comes into contact with the depressed section of the occupant side panel depends on the physical characteristics of the occupant. With the configuration described above, the outer peripheral shape of the depressed section will be elongated vertically and so if the physical characteristics of the occupant are larger or smaller than standard, the head of the occupant can be received and restrained in the depressed section.

When viewing from the occupant side toward the steering wheel side, the depressed section may have a shape where the dimension in the vertical direction is shorter than the dimension in the lateral direction. This results in a shape where the outer peripheral shape of the depressed section is elongated in the lateral direction. Therefore, in an impact where force is applied in a rotational direction on the vehicle and the head of the occupant enters from the left or the right direction, the head of the occupant can reliably be received by the depressed section and the head can be stably restrained.

A perpendicular line that perpendicularly intersects with the first or second inclined area of the occupant side panel of the cushion may intersect the side surface panel. With this manner of shape of cushion, regardless of the entry direction of the head of the occupant into the first and second inclined areas, the side surface panel will nearly always be present on the extension line in the entry direction. Therefore, the cushion will have thickness from the steering wheel toward the occupant side enabling the first and second inclined areas to receive the head of the occupant that enters, absorb the impact, suppress rotation of the head, and suitably protect the head.

The prescribed means described above includes:
a pair of main tethers positioned inside the cushion that span between the steering wheel side panel and the occupant side panel and have dimensions such that upon being tensioned during expansion and deployment of the cushion, pull the occupant side panel toward the steering wheel side, and
a pair of sub tethers positioned inside the cushion that span between a mid-section of the pair of main tethers and the occupant side panel and have dimensions such that upon being tensioned during expansion and deployment of the cushion, pull the occupant side panel toward the mid-section of the pair of main tethers; where
the pair of main tethers are separated and connected to edges of the depressed section of the occupant side panel;
the pair of sub tethers are separated and connected from a location of the occupant side panel to the inside of the edge of the depressed section; and
the dimension from the mid-section of the pair of main tethers to the occupant side panel is longer than the dimension of the pair of sub tethers.

In this manner, the first and second inclined areas are formed by the pair of main tethers being connected to the edge of the depressed section of the occupant side panel, in other words, to the boundary of the depressed section and the bulged section and the pair of sub tethers being connected to the inside of the edge of the depressed section. Furthermore, of the depressed section, a center area is formed closest to the steering wheel between the pair of sub tethers, and is not inclined.

The width of the pair of main tethers may be wider than the width of the pair of sub tethers. Thus, with this manner of occupant side panel having a wide pair of main tethers and a narrow pair of sub tethers, the center area of the depressed section that receives the head of the occupant, and the first inclined area of the depressed section and second inclined area of the bulged section that suppress rotation of the head of the occupant can be formed.

The pair of main tethers and pair of sub tethers described above may be provided lined up in the lateral direction of the vehicle or in the vertical direction of the vehicle. Thus, the pair of main tethers and pair of sub tethers being provided lined up in the lateral direction of the vehicle or in the vertical direction of the vehicle enable reliably forming the center area and first and second inclined areas of the occupant side panel.

The first and second inclined areas described above may be inclined at an angle of 10° or more relative to the reference plane that is orthogonal to the rotation axis of the steering wheel. In this manner, the first and second inclined areas that restrain the occupant are inclined at an angle of 10° or more from the reference plane, so the cushion receives the head of the occupant by means of the center area and first and second inclined areas formed in the occupant side panel while enabling reducing angular speed of rotation of the head of the occupant and suppressing Brain Injury Criterion. Note that if the inclined angle of the first and second inclined areas is less than 10°, in particular if less than 5°, angular speed of the head increases and suppressing Brain Injury Criterion becomes difficult.

Effect of the Invention

With the present invention, a driver seat airbag device is provided that, while receiving the head of an occupant by means of an expanded and deployed cushion, enables suppressing rotation of the head of the occupant and suitable protection of the head.

BRIEF DESCRIPTION OF THE DRAWINGS

FIG. 1(a) is a diagram illustrating a vehicle before activation of the driver seat airbag device. FIG. 1(b) illustrates a state of a cushion of the driver seat airbag device having been expanded and deployed.

FIG. 2(a) is a perspective view of the cushion and steering wheel of FIG. 1(b) as viewed obliquely from outside the vehicle. FIG. 2(b) is a cross-sectional view along A-A of the cushion of FIG. 2(a).

FIG. 3(a) schematically illustrates the internal structure through each panel of the cushion of FIG. 2(a). FIG. 3(b) and FIG. 3(c) illustrate the steering wheel side panel and occupant side panel that constitute the cushion of FIG. 2(b) spread out on a flat surface.

FIG. 4(a) illustrates an expanded and deployed state of a cushion of the driver seat airbag device. FIG. 4(b) is a cross-sectional view along K-K of the cushion of FIG. 4(a).

FIG. 6(a) illustrates a modified example of the cushion in FIG. 1(b) with a depressed section having vertically and horizontally equal dimensions. FIG. 6(b) illustrates a modified example of the cushion in FIG. 1(b) with a depressed section having a horizontal rectangle shape. FIG. 6(c) illustrates a modified example of the cushion in FIG. 1(b) with a depressed section having a horizontal oval shape. FIG. 6(d) illustrates a modified example of the cushion in FIG. 1(b) with a depressed section having a vertical rectangle shape. FIG. 6(e) illustrates a modified example of the cushion in FIG. 1(b) with a depressed section having a vertical oval shape.

DESCRIPTION OF THE PREFERRED EMBODIMENTS

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figure 1:
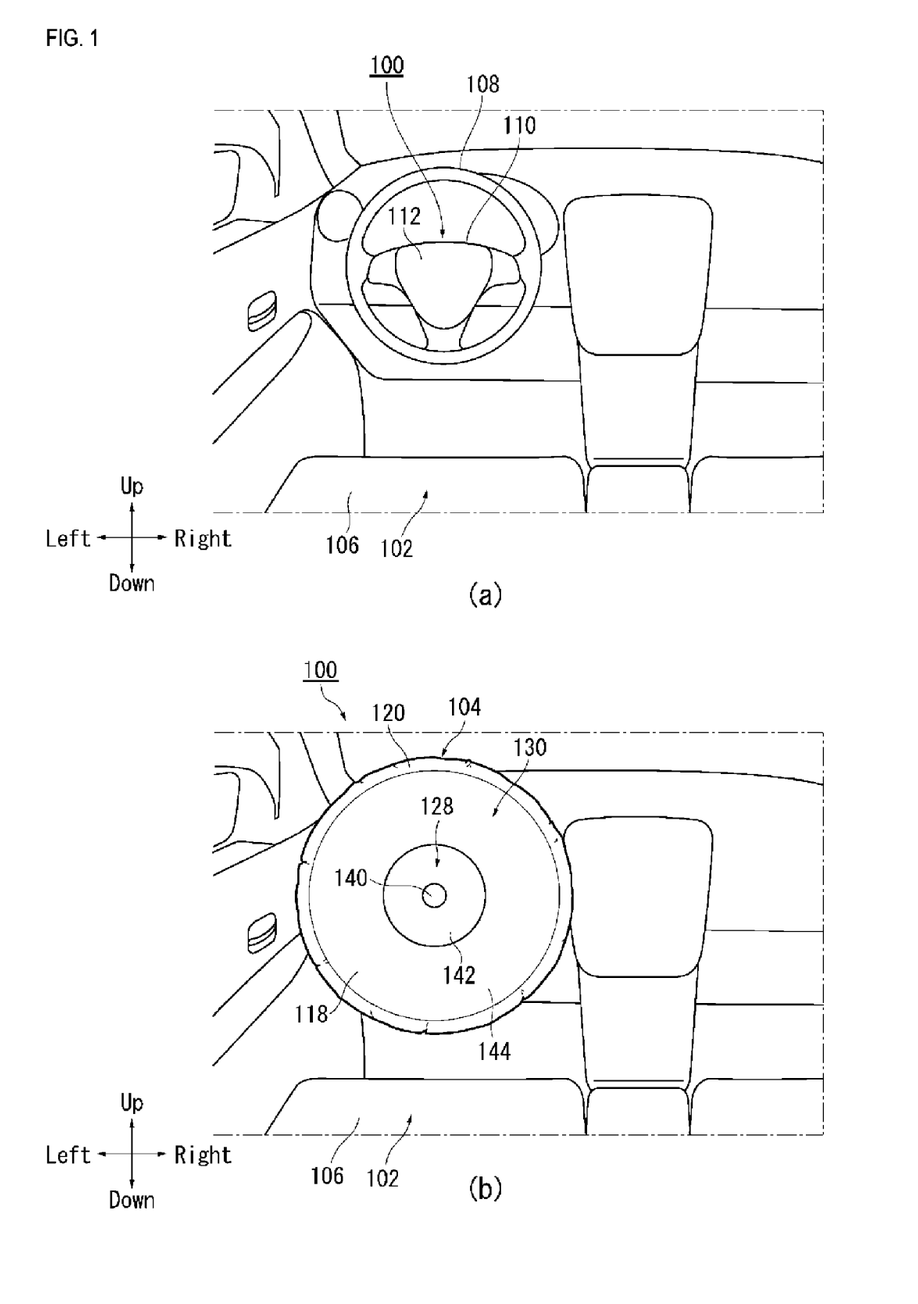
FIG. 1 is a diagram illustrating the outline of a driver seat airbag device according to an embodiment of the present invention.

FIG. 1 is a diagram illustrating the outline of a driver seat airbag device 100 according to an Embodiment of the present invention. FIG. 1(a) is a diagram illustrating a vehicle 102 before activation of the driver seat airbag device 100. FIG. 1(b) illustrates a state of a cushion 104 of the driver seat airbag device 100 having been expanded and deployed.

Regarding the present Embodiment, when an occupant is seated in a seat in a regular posture, the direction the occupant faces is referred to as front, and the opposite direction is referred to as rear. Furthermore, when the occupant is seated in the seat in a regular posture, the right of the occupant is referred to as the right direction, and the left of the passenger is referred to as the left direction. Furthermore, when the occupant is seated in a regular posture, the direction towards the head of the occupant is referred to as up, and the direction towards the legs of the occupant is referred to as down. Furthermore, as needed, any diagrams used in descriptions below will indicate the front, rear, left, right, up, and down directions based on the occupant as described above as Front, Rear, Left, Right, Up, and Down.

Note, the driver seat airbag device 100 is applied in the present Embodiment as the driver airbag for the driver's seat for vehicles with a steering wheel on a left side (front row left side vehicle seat 106). Hereinafter, descriptions are made assuming the front row left side vehicle seat 106, for example, a vehicle outer side in the vehicle width direction (hereinafter, vehicle outer side) refers to a left side of the vehicle, and an inner side in the vehicle width direction (hereinafter, vehicle inner side) refers to a right side of the vehicle.

The cushion 104 of the driver seat airbag device 100 is stowed in a hub 110 in the center of a steering wheel 108 in a folded or rolled state in front of the seating position of the vehicle seat 106. The hub 110 includes a housing (not shown) for stowing the cushion 104 and a cover 112 and the like. An inflator 114 (see FIG. 3(a)) is also stored inside the hub 110 together with the cushion 104.

By means of gas from the inflator 114, the cushion 104 cleaves the cover 112 while starting to expand and deploy, expands and deploys in a bag shape to the front of the seating position of the vehicle seat 106, and restrains the torso and head of the occupant from moving forward. In other words, the cushion 104 expands and deploys between the occupant seated in the vehicle seat 106 and the steering wheel 108. In addition, as illustrated in FIG. 1(b), the cushion 104 has a circular shape as viewed from the seating position side, and is formed by overlaying a plurality of panels (described below) that form the surface thereof through sewing or adhesion.

Figure 2:
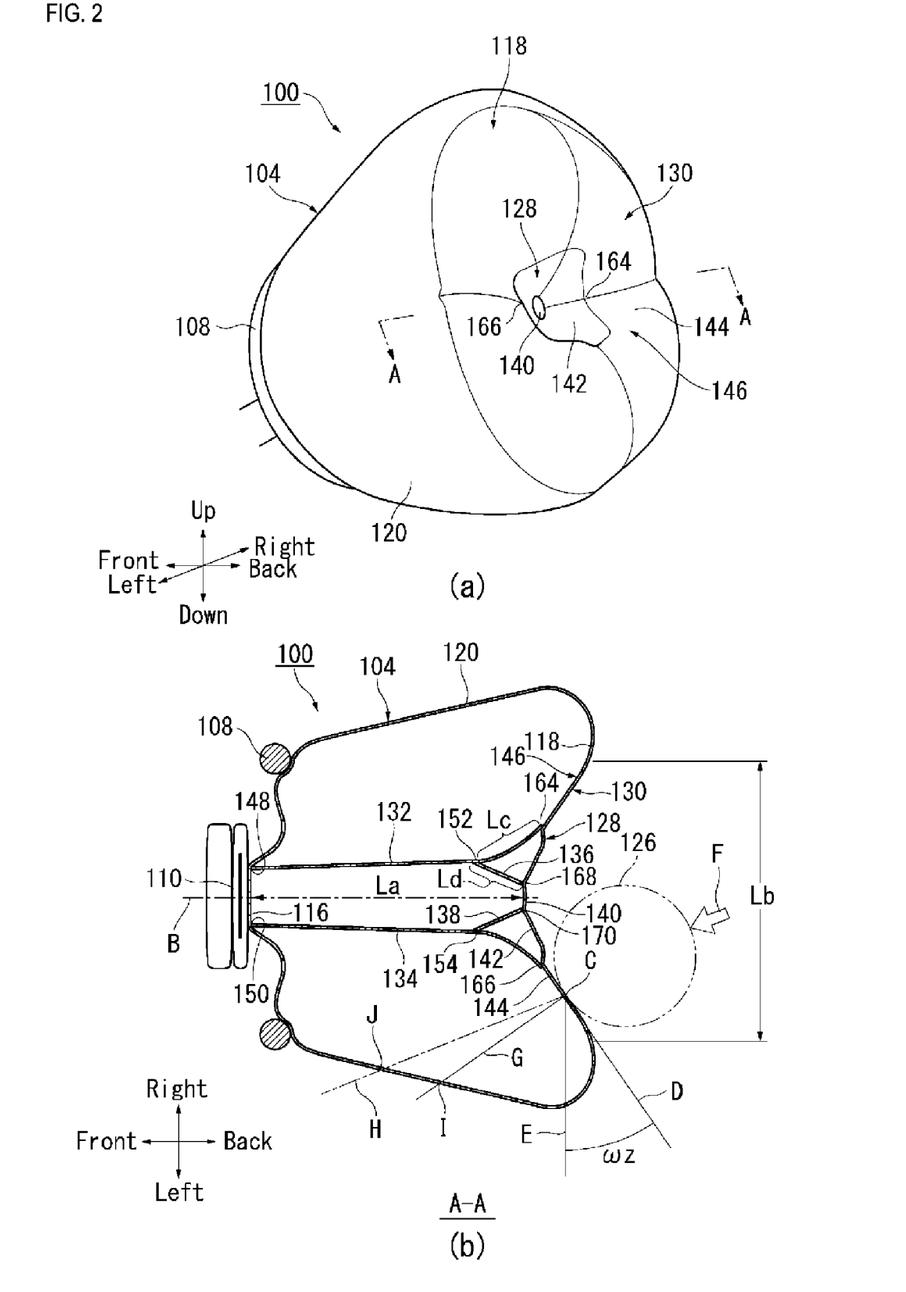
FIG. 2 is a diagram illustrating the driver seat airbag device of FIG. 1(b) as viewed from a different direction.

FIG. 2 is a diagram illustrating the driver seat airbag device 100 of FIG. 1(b) as viewed from a different direction. FIG. 2(a) is a perspective view of the cushion 104 and steering wheel 108 of FIG. 1(b) as viewed obliquely from outside the vehicle. FIG. 2(B) is a cross-sectional view along A-A of the cushion 104 of FIG. 2(a).

As illustrated in FIG. 2(a) and FIG. 2(b), the cushion 104 forms a shape close to a cone with a diameter that increases from the steering wheel 108 toward the occupant side (rear side of vehicle). The cushion 104 includes a steering wheel side panel 116 (see FIG. 2(b)), an occupant side panel 118, and a side surface panel 120.

Figure 3:
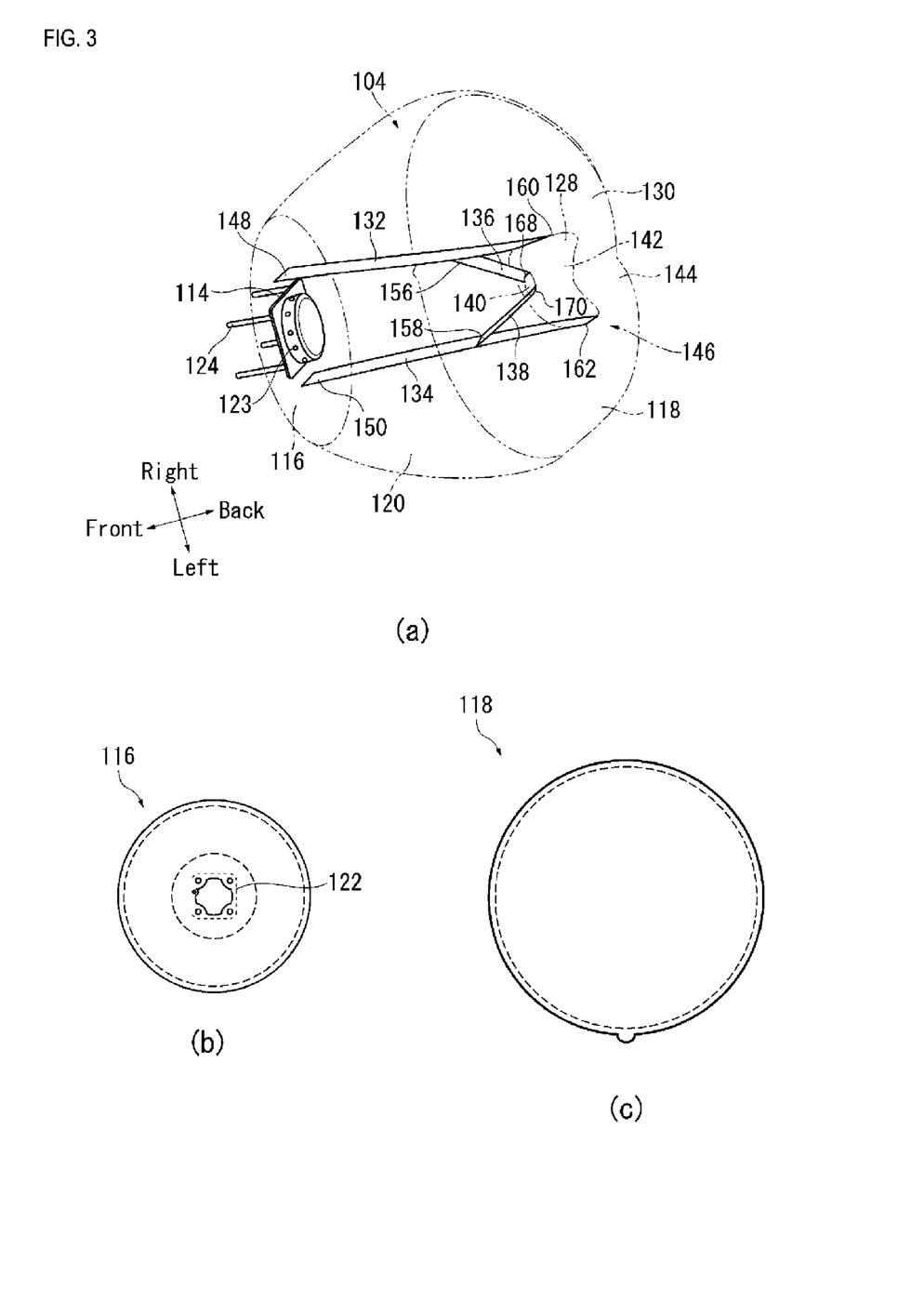
FIG. 3 is a diagram illustrating the driver seat airbag device of FIG. 2(a) in detail.

FIG. 3 is a diagram illustrating the driver seat airbag device 100 of FIG. 2(a) in detail. FIG. 3(a) schematically illustrates the internal structure through each panel of the cushion 104 of FIG. 2(a) and illustrates the cushion 104 obliquely from above to further clarify the internal structure. FIG. 3(b) and FIG. 3(c) illustrate the steering wheel side panel 116 and occupant side panel 118 that constitute the cushion 104 of FIG. 2(b) spread out on a flat surface.

The steering wheel side panel 116 is a panel positioned on the steering wheel 108 side. As illustrated in FIG. 3(b), the steering wheel side panel 116 is circular in shape and functions as a reaction force surface that obtains a reaction force from the steering wheel 108 when the cushion 104 expands and deploys. The cushion 104 expands and deploys in a shape of a truncated cone widening toward the occupant side, and therefore, the steering wheel side panel 116 has a narrower area than the occupant side panel 118 (see FIG. 3(*c*)). In addition, a securing area 122 is formed in the center of the steering wheel side panel 116. The securing area 122 has the inflator 114 inserted therein (see FIG. 3(*a*)) and is an area that is secure inside the hub 110 of the steering wheel 108.

The inflator 114 is a device for supplying gas, and in the present embodiment, a disk type is used. The part of the inflator 114 on which the gas discharge port 123 is formed is inserted from the securing area 122 of the steering wheel side panel 116 into the cushion 104. Upon receiving a signal detecting an impact sent from a sensor (not shown), the inflator 114 supplies gas through the gas discharge port 123 into the cushion 104. The inflator 114 is provided with a plurality of stud bolts 124. The stud bolts 124 pass through the securing area 122 of the steering wheel side panel 116 of the cushion 104 and fasten inside the hub 110 of the steering wheel 108 (see FIG. 1(*a*)) described above. The cushion 104 is also secured inside the hub 110 by fastening of the stud bolts 124.

Examples of currently prevailing inflators include: types filled with a gas generating agent and that burn the agent to generate a gas; types filled with a compressed gas which supply the gas without generating heat; hybrid types that utilize both a combustion gas and a compressed gas; and the like. The inflator 114 of the present Embodiment can use any of these types.

The occupant side panel 118 positioned on the occupant side is circular in shape, as illustrated in FIG. 3(*c*) and functions as an occupant restraint surface (described below) for restraining the occupant during expansion and deployment of the cushion 104. In addition, as described above, the cushion 104 expands and deploys in a cone shape expanding towards the occupant side and the occupant side panel 118 is configured with a larger surface area than that of the steering wheel side panel 116 (see FIG. 3(*b*)). As illustrated in FIG. 2(*a*) and FIG. 2(*b*), the side surface panel 120 connects the steering wheel side panel 116 and the occupant side panel 118 and forms the side surface of the cushion and thus, ensures a prescribed thickness of the cushion 104 facing from the steering wheel 108 toward the occupant.

In recent years, Brain Injury Criterion (BrIC) standards have been provided in conjunction with the introduction of the New Car Assessment Program (NCAP) in North America. The Brain Injury Criterion described here is believed to be largely influenced by rotation of the head of the occupant, in particular at high speed. Therefore, the driver seat airbag device 100 of the present Embodiment not only receives the head 126 (see FIG. 2(*b*)) of the occupant with the expanding and deploying cushion 104 but also utilizes a configuration that suppresses rotation of the head 126 and suitably protects the head 126.

Specifically, as illustrated in FIG. 2(*a*) and FIG. 2(*b*), the occupant side panel 118 of the cushion 104 includes a depressed section 128 and a bulged section 130. The depressed section 128 is a portion that is recessed toward the steering wheel 108 side. The bulged section 130 is positioned around the depressed section 128 and is a ring shaped portion that bulges toward the occupant side.

In the cushion 104, as prescribed means illustrated in FIG. 2(*b*) and FIG. 3(*a*), a pair of main tethers 132 and 134 and a pair of sub-tethers 136 and 138 pull the occupant side panel 118 toward the steering wheel side. Thus, of the occupant side panel 118, a center area 140 and first inclined area 142 are formed in the depressed section 128 illustrated in FIG. 2(*b*) and FIG. 3(*a*) and a second inclined area 144 is further formed in the bulged section 130.

The center area 140 of the depressed section 128 is the area of the occupant side panel 118 that is closest to the steering wheel 108 and as illustrated in FIG. 2(*b*), is positioned on the rotation axis B of the steering wheel 108. The first inclined area 142 of the depressed section 128 is an area inclined in a flared shape from the center area 140 toward the occupant side. The second inclined area 144 of the bulged section 130 is an area continuous with the first inclined area 142 and is inclined in a flared shape toward the occupant side.

The cushion 104 forms an occupant restraint surface 146 composed of the center area 140 of the occupant side panel 118, the first area 142, and the second area 144 to restrain the head 126 of the occupant. When restraining the head 126 of the occupant, the cushion 104 receives the head 126 of the occupant using the depressed section 128 and center area 140 of the occupant restraint surface 146 and suppresses rotation of the head 126 of the occupant by means of the first inclined area 142 and second inclined area 144 that are inclined in a flared shape from the center area 140 of the depressed section 128 toward the occupant side.

Since the center area 140 is positioned on the rotation axis B of the steering wheel 108, with the cushion 104, the force received from the head 126 of the occupant by the depressed section 128 of the occupant side panel 118 during expansion and deployment is received on the rotation axis B of the steering wheel 108 so the energy absorbed from the impact does not escape. Therefore, the cushion 104 can more reliably receive and protect the head 126 of the occupant.

Furthermore, with the cushion 104, a distance La from the center area 140 of the depressed section 128 illustrated in FIG. 2(*b*) to the steering wheel side panel 116 in contact with the hub 110 of the steering wheel 108 is roughly the same as a diameter Lb of the occupant restraint surface 146 composed of the center area 140, the first inclined area 142, and the second inclined area 144. Note that the diameter Lb of the occupant restraint surface 146 is the distance in the direction perpendicular to the rotation axis of the steering wheel 108. As the distance La and the diameter Lb are to some extent the same, this manner of cushion 104 has just the sufficient thickness to suitably protect the head 126 when the head 126 of the occupant is received by the depressed section 128.

As illustrated in FIG. 2(*b*) and FIG. 3(*a*), the pair of main tethers 132 and 134 are positioned inside the cushion 104 and span between the steering wheel side panel 116 and the occupant side panel 118. The pair of main tethers 132 and 134 are provided dimensions so as to pull the occupant side panel 118 to the steering wheel 108 side when tensioned during expansion and deployment of the cushion 104. Note that first ends 148 and 150 of the pair of main tethers 132 and 134 are connected to the steering wheel side panel 116.

The pair of sub-tethers 136 and 138 are positioned inside the cushion 104 and as illustrated in FIG. 2(*b*), span between mid-sections 152 and 154 of the pair of main tethers 132 and 134 and the occupant side panel 118. The pair of sub-tethers 136 and 138 are provided dimensions so as to pull the occupant side panel 118 to the mid-sections 152 and 154 of the pair of main tethers 132 and 134 when tensioned during expansion and deployment of the cushion 104. Note that first ends 156 and 158 of the pair of sub-tethers 136 and 138 (see FIG. 3(*a*)) are connected to the mid-sections 152 and 154 of the main tethers 132 and 134, as illustrated in FIG. 2(*b*).

Here, second ends 160 and 162 of the pair of main tethers 132 and 134 (see FIG. 3(*a*)) are connected mutually separated to the edges 164 and 166 of the depressed section 128 as illustrated in FIG. 2(a) and FIG. 2(b) of the occupant side panel 118. In addition, second ends 168 and 170 of the pair of sub-tethers 136 and 138 (see FIG. 2(b) and FIG. 3(a)) are connected mutually separated more to the inside than the edges 164 and 166 of the depressed section 128, of the occupant side panel 118. As illustrated in FIG. 2(b), the dimension Lc from the mid-sections 152 and 154 of the pair of main tethers 132 and 134 to the second ends 160 and 162, in other words, the edges 164 and 166 of the depressed section 128 of the occupant side panel 118, is longer than the dimension Ld from the first ends 156 and 158 to the second ends 168, 170 of the pair of sub-tethers 136 and 138.

In this manner, with the cushion 104, as prescribed means, the pair of main tethers 132 and 134 are connected to the edges 164 and 166 of the depressed section 128 of the occupant side panel 118, in other words, the boundary of the depressed section 128 and the bulged section 130. In addition, with the cushion 104, as prescribed means, the pair of sub-tethers 136 and 138 are connected more to the inside than the edges 164 and 166 of the depressed section 128.

Thus, by the occupant side panel 118 being pulled to the steering wheel side by prescribed means, the first inclined area 142 and second inclined area 144 are formed in the cushion 104. Furthermore, of the depressed section 128, a center area 140 is formed closest to the steering wheel 108 between the pair of sub-tethers 136 and 138, is not inclined, and is nearly flat. Note that the occupant restraint surface 146 is formed including the center area 140, the first inclined area 142, and the second inclined area 144 but while the center area 140 is less sloped than the first inclined area 142 and the second inclined area 144, it does not necessarily have to be formed nearly flat.

In addition, the pair of main tethers 132 and 134 and pair of sub-tethers 136 and 138 are provided lined up in the vehicle width direction as illustrated in FIG. 2(b) and FIG. 3(a). Thus, the cushion 104 is reliably able to form the occupant restraint surface 146 including the center area 140, the first inclined area 142, and the second inclined area 144 on the occupant side panel 118.

However, the pair of main tethers 132 and 134 and pair of sub-tethers 136 and 138 may be provided lined up in the vertical direction of the vehicle and not limited to the vehicle width direction. In this manner, the occupant restraint surface 146 can be formed on the occupant side panel 118.

Furthermore, the width of the pair of main tethers 132 and 134 is broader than the width of the pair of sub-tethers 136 and 138. Therefore, the occupant side panel 118 can form an occupant restraint surface 146 by means of a pair of wide width main tethers 132 and 134 and a pair of narrow width sub-tethers 136 and 138.

Here, the slopes of the first inclined area 142 and the second inclined area 144 will be described. FIG. 2(b) illustrates a tangent point C, a tangent line D, and a reference plane E. The tangent point C is the point on the occupant restraint surface 146 where the head 126 of the occupant contacts the second inclined area 144 in the prescribed entry direction indicated by the arrow F. The tangent line D is a line along the slope of the first inclined area 142 and the second inclined area 144. The reference plane E is a plane orthogonal to the rotation axis of the steering wheel 108 illustrated as a line. In the present Embodiment, the angle of the tangent line D relative to the reference plane E is taken to be a restraint surface angle ωz.

FIG. 2(b) further illustrates a perpendicular line G and an extension line H. The perpendicular line G is a line that passes through the tangent point C and is perpendicular to the tangent line D. The extension line H is a line that passes through the tangent point C along the entry direction indicated by the arrow F. With the cushion 104, the perpendicular line G intersects with the side surface panel 120 at the intersection I. With this manner of shape of cushion 104, for various entry directions of the head 126 of the occupant entering the first inclined area 142 and second inclined area 144, the side surface panel 120 will nearly always be present on the extension line H in the entry direction, as illustrated by the intersection J.

Therefore, the cushion 104 is provided with thickness from the steering wheel 108 towards the occupant side enabling absorbing the impact of receiving the head 126 of the occupant that enters into the first inclined area 142 and the second inclined area 144, suppressing rotation of the head 126, and suitably protecting the head 126.

The present inventors discovered that larger angles of the restraint surface angle ωz of the cushion 104 reduced rotation, in other words, angular velocity of the head 126 of the occupant enabling suppressing Brain Injury Criterion. Herein, Free Fright Impactor evaluation (CAE) was performed using the driver seat airbag device 100 of the present Embodiment and the driver seat airbag device 200 of the Comparative Example illustrated in FIG. 4.

Figure 4:
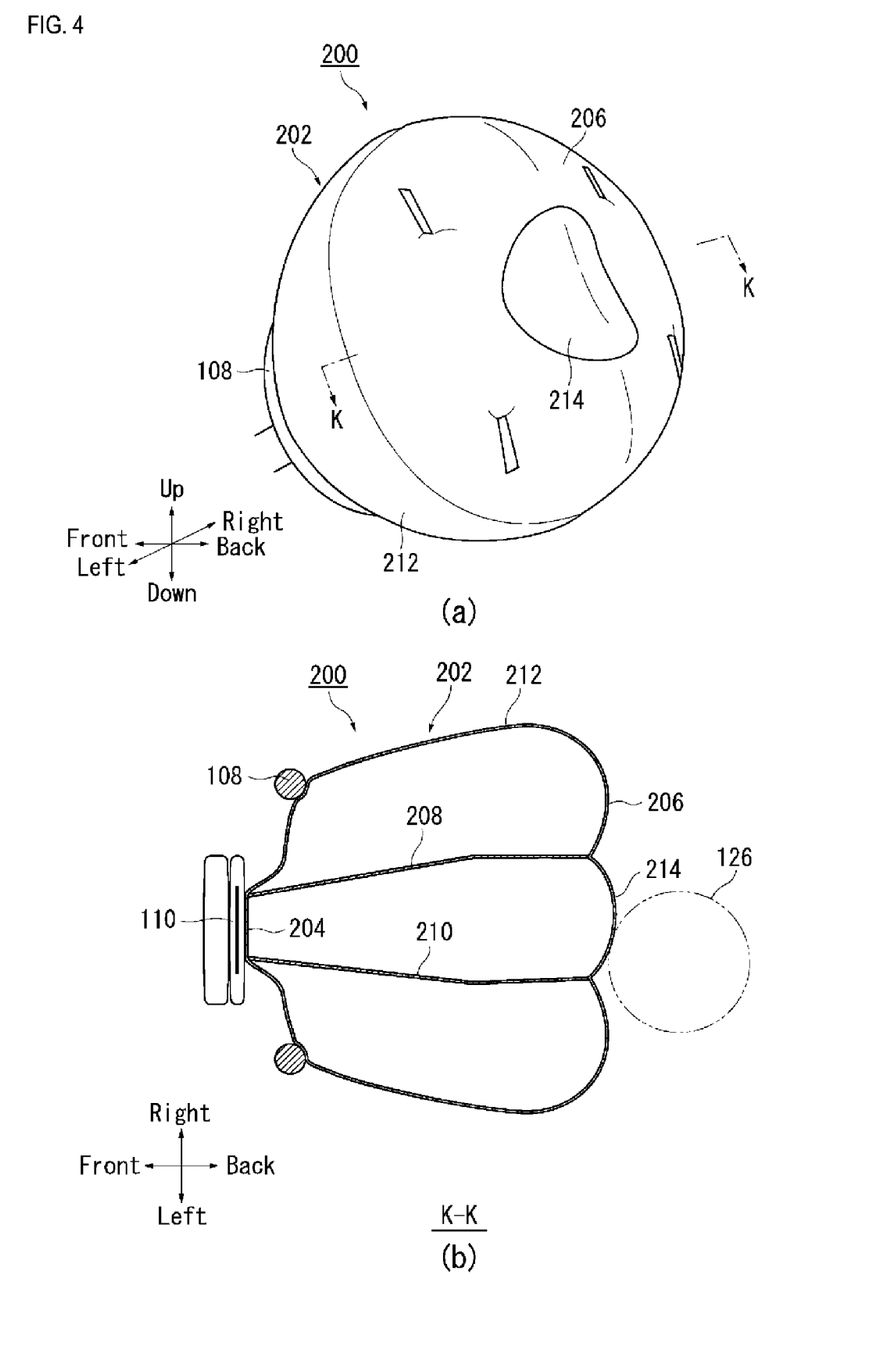
FIG. 4 is a diagram illustrating a driver seat airbag device of a Comparative Example.

FIG. 4 is a diagram illustrating a driver seat airbag device 200 of a Comparative Example. FIG. 4(a) illustrates an expanded and deployed state of a cushion 202 of the driver seat airbag device 200. FIG. 4(B) is a cross-sectional view along K-K of the cushion 202 of FIG. 4(a).

In the cushion 202, there are a pair of internal tethers 208 and 210 that span between the steering wheel side panel 204 and the occupant side panel 206 and further a side surface panel 212 that connects the steering wheel side panel 204 and the occupant side panel 206. However, the depressed section 128 and bulged section 130 of the cushion 104 are not formed in the occupant side panel 206 of the cushion 202 and a protruding section 214 protruding toward the occupant side is formed between the pair of internal tethers 208 and 210. Therefore, with the cushion 202 of the Comparative Example, the head 126 of the occupant is received by the protruding section 214 as in FIG. 4(b) reducing the restraint surface angle ωz.

Figure 5:
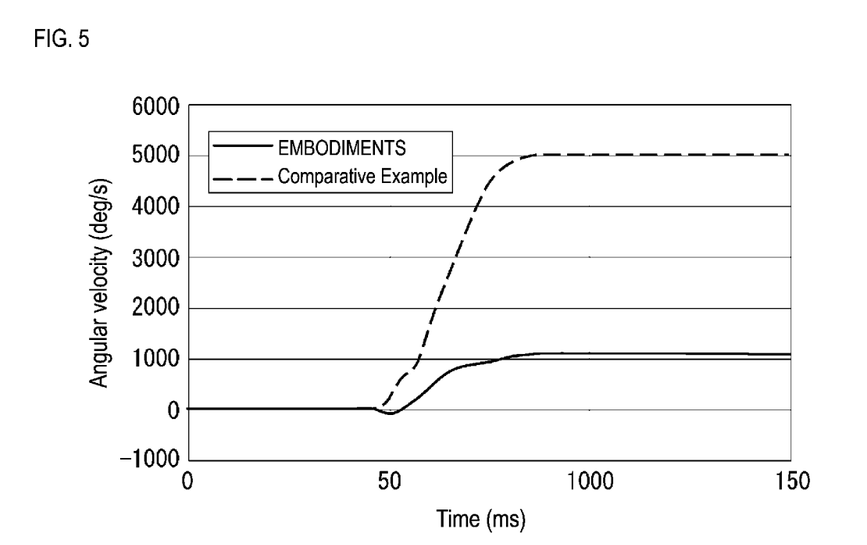
FIG. 5 is a diagram illustrating an evaluation of the driver seat airbag device according to the present embodiment and the driver seat airbag device of the Comparative Example.

FIG. 5 is a diagram illustrating an evaluation of the driver seat airbag device 100 according to the present Embodiment and the driver seat airbag device 200 of the Comparative Example. In the graph, the vertical axis is angular velocity (deg/s) of the head 126 and the horizontal axis is time (ms). Note that measurement values for the cushion 104 of the present Embodiment are indicated with a solid line and that the measurement values of the cushion 202 of the Comparative Example are indicated with a dotted line. Furthermore, the evaluation was performed with changing values of the restraint surface angle ωz.

As a result, when the restraint surface angle ωz is less than 10° and in particular 5° or less, the angular velocity of the head 126 becomes remarkably large as indicated by the dotted line in the graph, and it is clear that Brain Injury Criterion becomes difficult to suppress. On the other hand, if the restraint surface angle ωz is 10° or more, the angular velocity of the head 126 is small as indicated by the solid line in the graph and it is clear that Brain Injury Criterion can be suppressed.

With the driver seat airbag device 100 of the present Embodiment, of the occupant restraint surface 146 of the cushion 104, the restraint surface angle ωz of the first inclined area 142 and the second inclined area 144 is set to 10° or higher. Therefore, the cushion 104 receives the head 126 of the occupant by means of the center area 140 formed in the occupant side panel 118 and the first inclined area 142 and the second inclined area 144 suppress rotation and reduce angular velocity of the head 126 of the occupant, thus suppressing Brain Injury Criterion.

Figure 6:
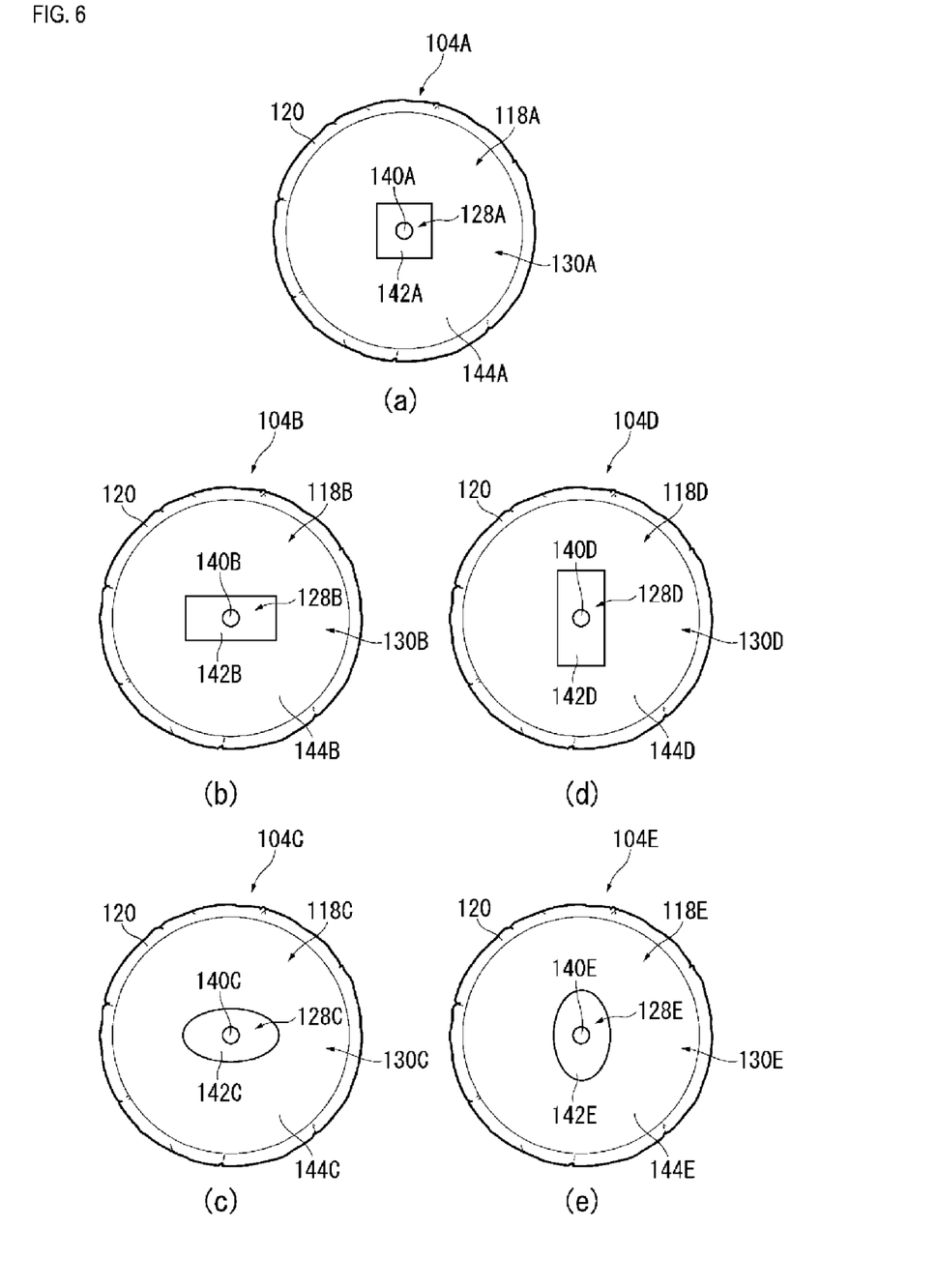
FIG. 6 is a diagram illustrating a Modified Example of the cushion in FIG. 1(b).

FIG. 6 is a diagram illustrating a Modified Example of the cushion 104 of FIG. 1(b). With the cushions 104, 104A illustrated in FIG. 1(b), FIG. 6(a), when viewing the depressed sections 128, 128A from the occupant side toward the steering wheel 108 side, for example, when viewing the depressed sections 128, 128A from a plane that is orthogonal to the rotation axis B (see FIG. 2(b)) of the steering wheel 108, the outer peripheral shape of the depressed sections 128, 128A is a circle or square shape, in other words, vertically symmetrical and laterally symmetrical and furthermore, the dimension in the vertical direction and dimension in the lateral direction are the same. Therefore, with the cushion 104, 104A, regardless of what direction, up, down, left or right, the head 126 of the occupant enters the depressed section 128, 128A of the occupant side panel 118, 118A during expansion and deployment, the head 126 of the occupant can reliably be received by the depressed section 128, 128A and the head 126 can be stably restrained. Note that the cushion 104A has the center area 140A and first inclined area 142A formed in the depressed section 128A illustrated in FIG. 6(a) and further the second inclined area 144A formed in the bulged section 130A and with these areas, receives the head 126 of the occupant, suppresses rotation of the head 126, and can suppress Brain Injury Criterion.

With the cushions 104B, 104C illustrated in FIG. 6(b) and FIG. 6(c), the outer periphery shapes of the depressed sections 128B, 128C are respectively a horizontal rectangle and an oval shape, in other words, vertically symmetrical and laterally symmetrical and furthermore, the dimension in the vertical direction is shorter than the dimension in the lateral direction. Thus, with the cushions 104B, 104C, in a collision where force is applied in the rotation direction of the vehicle, even if the head 126 of the occupant enters from the left or right direction, the head 126 can reliably be received by the depressed sections 128B, 128C of the occupant side panels 118B, 118C and the head 126 can stably be restrained. With the cushions 104B, 104C, center areas 140B, 140C and first inclined areas 142B, 142C are formed in depressed sections 128B, 128C and further, second inclined areas 144B, 144C are formed in bulged sections 130B, 130C and with these areas, the head 126 of the occupant can be received, rotation of the head 126 can be suppressed, and thus, Brain Injury Criterion can be suppressed.

With the cushions 104D, 104E illustrated in FIG. 6(d) and FIG. 6(e), the outer periphery shapes of the depressed sections 128D, 128E are respectively a vertical rectangle and an oval shape, in other words, vertically symmetrical and laterally symmetrical and furthermore, the dimension in the vertical direction is longer than the dimension in the lateral direction. Here, the vertical position where the head 126 of the occupant comes into contact with the depressed sections 128D, 128E of the occupant side panels 118D, 118E depends on the physical characteristics of the occupant. With the cushions 104D, 104E, the outer peripheral shape of the depressed sections 128D, 128E will be elongated vertically and so if the physical characteristics of the occupant are larger or smaller than standard, the head 126 of the occupant can be received and restrained in the depressed sections 128D, 128E. With the cushions 104D, 104E, center areas 140D, 140E and first inclined areas 142D, 142E are formed in depressed sections 128D, 128E and further, second inclined areas 144D, 144E are formed in bulged sections 130D, 130E and with these areas, the head 126 of the occupant can be received, rotation of the head 126 can be suppressed, and thus, Brain Injury Criterion can be suppressed.

Note that the outer peripheral shapes of the depressed sections 128, 128A, 128B, 128C, 128D, and 128E were described as circular, square, vertical rectangle or oval, and horizontal rectangle or oval; however the shapes are not limited to these and as long as reliable receiving of the head 126 of the occupant is feasible, the shapes may be any suitable vertically symmetrical and laterally symmetrical shape.

Preferred Embodiments of the present invention were described with reference to the appended drawings, but it goes without saying that the present invention is not limited to such examples. It is clear that a person of ordinary skill in the art could conceive various modifications or revisions within the scope set forth by the claims, and it would be understood that these modifications or revisions would belong to the technical scope of the present invention.

In addition, examples in which the driver seat airbag device 100 according to the present invention was applied in a vehicle were described in the Embodiments above, however, the present invention can also be applied to airplanes, ships, and other applications in addition to vehicles, and the same operations and effects can be obtained.

INDUSTRIAL APPLICABILITY

The present invention can be used as a driver seat airbag device provided with a cushion to restrain an occupant during an emergency.

EXPLANATION OF CODES 100, 200. Driver seat airbag device, 102. Vehicle, 104, 104A, 104B, 104C, 104D, 104E, 202. Cushion, 106. Vehicle seat, 108. Steering wheel, 110. Hub, 112. Cover, 114. Inflator, 116, 204. Steering wheel side panel, 118, 118A, 118B, 118C, 118D, 118E, 206. Occupant side panel, 120, 212. Side surface panel, 122. Securing area, 123. Gas discharge port, 124. Stud bolt, 126. Head of occupant, 128, 128A, 128B, 128C, 128D, 128E. Depressed section, 130, 130A, 130B, 130C, 130D, 130E. Bulged section, 132, 134. Main tether, 136, 138. Sub tether, 140, 140A, 140B, 140C, 140D, 140E. Center area, 142, 142A, 142B, 142C, 142D, 142E. First inclined area, 144, 144A, 144B, 144C, 144D, 144E. Second inclined area, 146. Occupant restraint surface, 148, 150. First end of main tether, 152, 154. Mid-section, 156, 158. First end of sub tether, 160, 162. Second end of main tether, 164, 166. Edge of depressed section, 168, 170. Second end of sub tether, 208, 210. Internal tether, 214. Protruding section

The invention claimed is:
1. A driver seat airbag device, comprising:
an inflator stowed in a steering wheel of a vehicle; and
a cushion stowed in the steering wheel with the inflator that uses gas supplied from the inflator to expand and deploy, the cushion configured to deploy between the steering wheel and an occupant in a driver seat; wherein
the cushion includes:
a steering wheel side panel positioned on a steering wheel side, an occupant side panel having a larger surface area than the steering wheel side panel positioned on an occupant side, and a side surface panel that connects the steering wheel side panel and the occupant side panel and forms a side surface of the cushion;

the occupant side panel includes:

a depressed section recessed towards the steering wheel side, and a bulged section positioned surrounding the depressed section that bulges in a ring shape toward the occupant side; where a prescribed location of the occupant side panel is pulled to the steering wheel side by tethers including:

a pair of main tethers positioned inside the cushion that span between the steering wheel side panel and the occupant side panel and have dimensions such that upon being tensioned during expansion and deployment of the cushion, pull the occupant side panel toward the steering wheel side, and a pair of sub tethers positioned inside the cushion that span between a mid-section of the pair of main tethers and the occupant side panel and have dimensions such that upon being tensioned during expansion and deployment of the cushion, pull the occupant side panel toward the mid-section of the pair of main tethers; where the pair of main tethers are separated and connected to edges of the depressed section of the occupant side panel;

the pair of sub tethers are separated and connected from the mid-section of the pair of main tethers to an inside of an edge of the depressed section such that the depressed section forms a center area closest to the steering wheel and a first inclined area inclined in a flared shape from the center area toward the occupant side and the bulged section forms a second inclined area that is continuous with the first inclined area and is inclined in a flared shape toward the occupant side; and the cushion is configured to restrain a head of the occupant with the center area and the first and second inclined areas.

2. The driver seat airbag device according to claim 1, wherein the center area of the depressed section is positioned on a rotation axis of the steering wheel.

3. The driver seat airbag device according to claim 1, wherein when the depressed section is viewed from the occupant side toward the steering wheel side the depressed section has a vertically symmetrical and laterally symmetrical shape.

4. The driver seat airbag device according to claim 3, wherein the shape of the depressed section is such that when viewed from the occupant side toward the steering wheel side, a first dimension in a vertical direction and a second dimension in a lateral direction are the same.

5. The driver seat airbag device according to claim 3, wherein the shape of the depressed section is such that when viewed from the occupant side toward the steering wheel side, a first dimension in a vertical direction is longer than a second dimension in a lateral direction.

6. The driver seat airbag device according to claim 3, wherein the shape of the depressed section is such that when viewed from the occupant side toward the steering wheel side, a first dimension in a vertical direction is shorter than a second dimension in a lateral direction.

7. The driver seat airbag device according to claim 1, wherein a perpendicular line that perpendicularly intersects the first or second inclined area of the occupant side panel of the cushion intersects with the side surface panel.

8. A driver seat airbag device according to claim 1, wherein
a dimension from the mid-section of the pair of main tethers to the occupant side panel is longer than a dimension of the pair of sub tethers.

9. The driver seat airbag device according to claim 1, wherein a width of the pair of main tethers is wider than a width of the pair of sub tethers.

10. The driver seat airbag device according to claim 1, wherein at least one of the pair of main tethers and the pair of sub tethers are provided lined up in a width direction of the vehicle or a vertical direction of the vehicle.

11. The driver seat airbag device according to claim 1, wherein the first and second inclined areas are sloped at an angle of 10° or more relative to a reference plane that is orthogonal to a rotation axis of the steering wheel.

* * * * *